United States Patent
Magro

(10) Patent No.: US 6,556,952 B1
(45) Date of Patent: *Apr. 29, 2003

(54) PERFORMANCE MONITORING AND OPTIMIZING OF CONTROLLER PARAMETERS

(75) Inventor: James R. Magro, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/564,208

(22) Filed: May 4, 2000

(51) Int. Cl.$^7$ .................................................. G06F 11/30

(52) U.S. Cl. ....................... 702/183; 702/182; 702/189; 702/198

(58) Field of Search ................................. 702/182, 183, 702/189, 198; 714/47, 39, 712, 719, 724, 736; 709/104; 710/52; 345/27; 365/193; 324/73

(56) References Cited

U.S. PATENT DOCUMENTS

| | | | |
|---|---|---|---|
| 3,812,478 A | 5/1974 | Tomisawa et al. | 340/173 |
| 3,887,869 A | 6/1975 | Connolly et al. | 324/73 |
| 4,115,867 A | 9/1978 | Vlaqdimirov et al. | 364/900 |
| 4,176,402 A | 11/1979 | Sipple | 364/900 |
| 4,219,877 A | 8/1980 | Vladimirov et al. | 364/554 |

(List continued on next page.)

FOREIGN PATENT DOCUMENTS

WO    WO 99/57640    11/1999

OTHER PUBLICATIONS

IBM Technical Disclosure Bulletin "Self–Adjusting Utilization Monitor", vol. 38, No. 2, Feb. 1995, pp. 371–372.

Rohava, S. Ye., "Elements of Stochastic Systems—Instrumentation of Non–Deterministic Learning Patterns", Soviet Automatic Control, vol. 13, No. 5, 1968, pp. 67–69.

Gaines, Brian R., "Stochastic computer thrives on noise", ELectronics, vol. 40, No. 14, Jul. 10, 1967, pp. 72–81.

IBM Technical Disclosure Bulletin, vol. 40, No. 1, "Processor Performance Monitoring with a Depiction of the Efficiency of the Cache Coherency Protocol of a Superscalar Microprocessor in an Symmetric Multiple Processor Environment", Jan. 1997, pp. 79–81.

(List continued on next page.)

*Primary Examiner*—John Barlow
*Assistant Examiner*—Stephen J. Cherry
(74) *Attorney, Agent, or Firm*—Zagorin, O'Brien & Graham, LLP

(57) ABSTRACT

An integrated circuit, system and method monitors parameter performance for optimization of controller performance. The integrated circuit includes a memory controller, one or more buffers coupled to the memory controller, and a performance monitoring circuit coupled to the one or more buffers and an SDRAM controller, the performance monitoring circuit to receive at least one parameter related to the buffers and provide statistical data related to the parameter. The statistical data may be used to set an amount of data to accumulate in the one or more buffers. A method includes transmitting one or more parameters related to performance of one more components of an integrated circuit to a performance monitoring circuit located within the integrated circuit. The performance monitoring circuit then determines statistical data related to the parameter independent of an interrupt to the integrated circuit. Further, the method includes transmitting the statistical data to a register in the integrated circuit and software interpreting the statistical data according to predetermined parameters to improve functionality of the component. The method includes either altering functionality or maintaining functionality of the component of the integrated circuit according to the interpretation of the statistical data.

40 Claims, 5 Drawing Sheets

U.S. PATENT DOCUMENTS

| | | | |
|---|---|---|---|
| 4,409,592 A | | 10/1983 | Hunt ........................ 340/825.5 |
| 4,608,559 A | | 8/1986 | Friedman et al. ......... 340/825.5 |
| 4,694,412 A | | 9/1987 | Domenik et al. ............ 364/717 |
| 5,229,758 A | * | 7/1993 | Hsu ............................. 345/27 |
| 5,392,289 A | | 2/1995 | Varian ......................... 371/5.4 |
| 5,412,587 A | | 5/1995 | Holt et al. ................... 364/717 |
| 5,557,548 A | * | 9/1996 | Gover et al. ................. 702/176 |
| 5,652,856 A | * | 7/1997 | Santeler et al. .............. 365/193 |
| 5,657,253 A | | 8/1997 | Dreyer et al. ........... 364/551.01 |
| 5,675,797 A | * | 10/1997 | Chung et al. ................ 709/104 |
| 5,696,828 A | | 12/1997 | Koopman, Jr. ............... 380/46 |
| 5,732,240 A | * | 3/1998 | Caccavale ..................... 710/56 |
| 5,768,152 A | | 6/1998 | Battaline et al. ........ 364/551.01 |
| 5,768,500 A | | 6/1998 | Agrawal et al. ........ 395/184.01 |
| 5,778,194 A | | 7/1998 | McCombs ................... 395/280 |
| 5,835,702 A | | 11/1998 | Levine et al. ........... 395/183.15 |
| 5,835,705 A | | 11/1998 | Larsen et al. ........... 395/184.01 |
| 5,919,268 A | | 7/1999 | McDonald .................... 714/47 |
| 6,018,620 A | * | 1/2000 | Culley et al. ................. 710/52 |
| 6,038,195 A | | 3/2000 | Farmwald et al. .......... 365/233 |
| 6,119,075 A | | 9/2000 | Dean et al. .................. 702/186 |
| 6,151,658 A | * | 11/2000 | Magro ......................... 711/110 |
| 6,275,782 B1 | * | 8/2001 | Mann .......................... 702/182 |
| 6,279,077 B1 | * | 8/2001 | Nasserbakht et al. ......... 710/52 |

OTHER PUBLICATIONS

Miller, A.J. et al., "A study for an output interface for a digital stochastic computer", Int. J. Electronics, vol. 37, No. 5, 1974, pp. 637–655.

Richter, Jeffrey for Microsoft Corporation, "Custom Performance Monitoring for Your Windows NT Applications", copyright 1998, pp. 1–25, http://premium.microsoft.com/msdn/library/periodic/period98/html/layouts_performa_performa_Oigi.htm.

IBM Technical Disclosure Bulletin "Hardware Performance Trace Enhancement to Include Performance Events", vol. 39, No. 10, Oct. 1996, pp. 87–88.

* cited by examiner

PERFORMANCE MONITORING AND OPTIMIZING OF CONTROLLER PARAMETERS

BACKGROUND OF THE INVENTION

1. Field of the Invention

The present invention relates to an apparatus and method for performance monitoring and more specifically the performance monitoring and optimization of controller parameters.

2. Description of the Related Art

Many microprocessors used in desktop computer systems, are equipped with performance monitoring counters. These counters permit processor performance parameters to be monitored and measured. Such information is useful for performance tuning. Current techniques typically utilize two counters that simultaneously record the occurrence of pre-specified events. When one of the counters overflows, counting stops, an interrupt is generated. Post-processing software is used to analyze the gathered data.

Typically two large counters, of e.g., 40-bits or more, are provided for event counting. The counters can generally be read and written from within register address space. The counters can be configured to measure such parameters as the number of data reads that hit in the cache. When configured to determine cache hits, the first counter is programmed to record the number of cache hits and the second counter is programmed to record the number of actual data reads performed. The ratio of the two numbers gives the cache-hit rate for read operations. Measured performance parameters are a good estimate of future performance. Actual performance at any instant may vary widely from the measured estimate. The typical use of two large counters does not measure this deviation from the average.

When one of the counters reaches its limit, the overflow signal stops all counting and generates an interrupt. The software interrupt handler then records the counter values, completes post data processing and any other support work necessary.

It would be desirable to have a system and method for monitoring performance that does not require an interrupt for monitoring performance, and also provides a method of obtaining feedback for optimizing components of an integrated circuit such as a processor or a controller.

SUMMARY OF THE INVENTION

Accordingly, the invention provides a new technique for monitoring and optimizing components in accordance with a statistical analysis of component parameters. More specifically, a system, method and an integrated circuit monitors parameter performance for optimization of components. The integrated circuit includes a memory controller, one or more buffers coupled to the memory controller, and a performance monitoring circuit coupled to the one or more buffers and the memory controller, the performance monitoring circuit to receive at least one parameter related to the buffers and provide statistical data related to the parameter. The statistical data is used to set an amount of data to accumulate in the one or more buffers, or configure various parameters in the memory controller.

According to a further embodiment, a method includes transmitting one or more parameters related to performance of one more components of an integrated circuit to a performance monitoring circuit located within the integrated circuit. The performance monitoring circuit then determines statistical data related to the parameter independent of an interrupt to the integrated circuit. Further, the method includes transmitting the statistical data to a register in the integrated circuit and interpreting the statistical data according to predetermined parameters to improve functionality of the component. The interpreting is accomplished through software that sets a configuration. The method further includes either altering functionality or maintaining functionality of the component of the integrated circuit according to the interpretation of the statistical data.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1A:
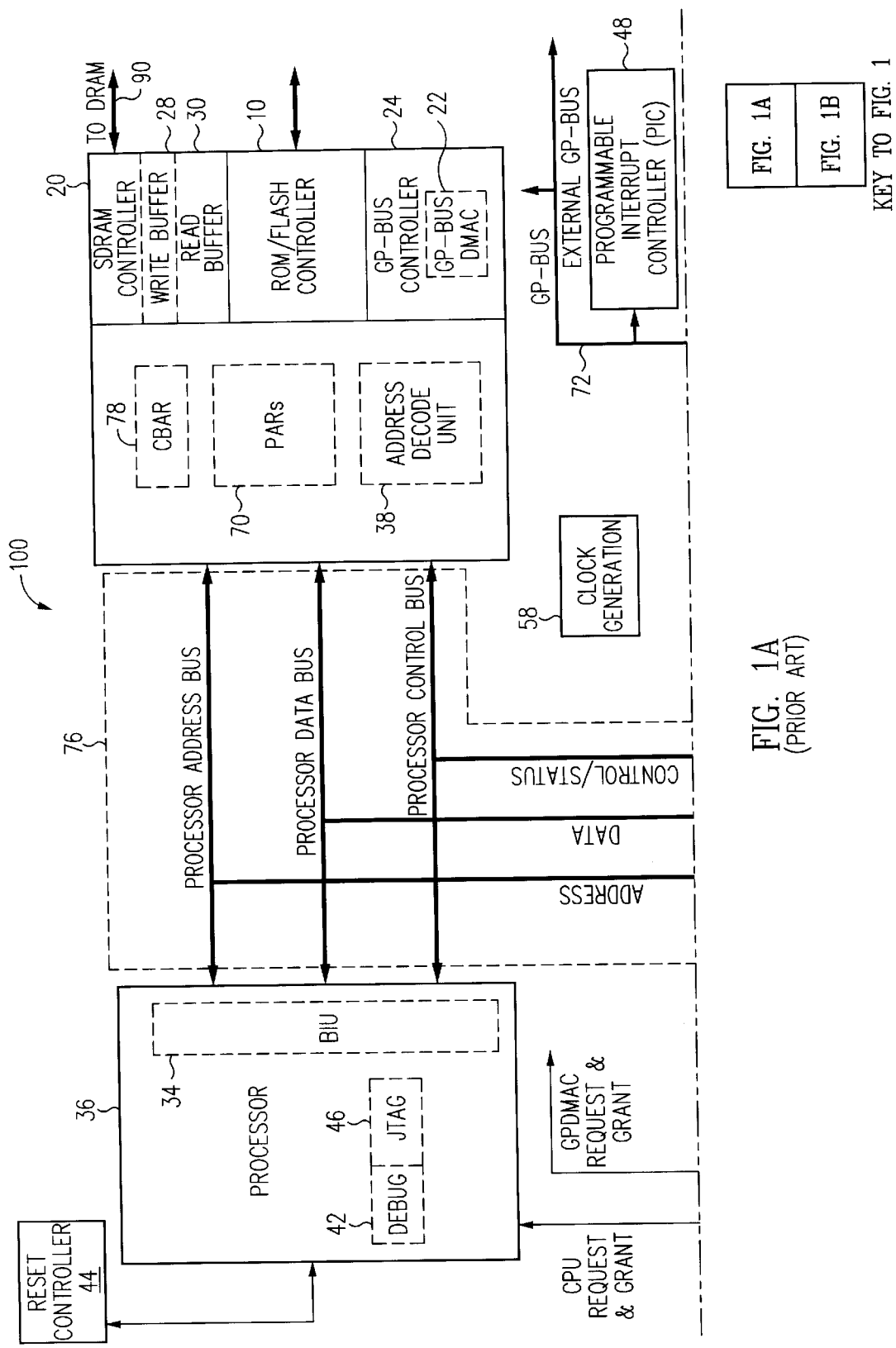
FIG. 1 shows a microcontroller in accordance with the present invention.
Figure 1B:
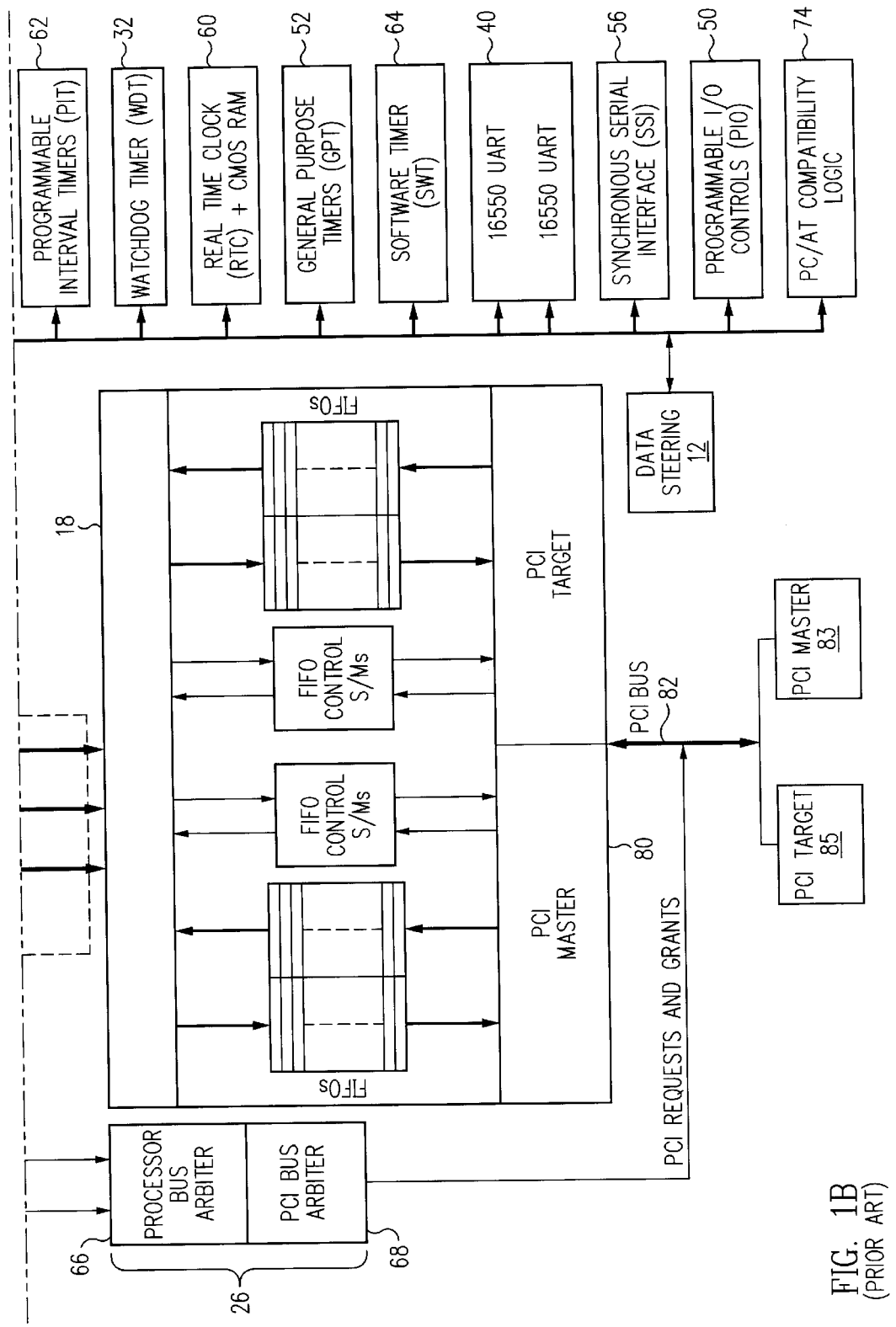

Referring to FIG. 1, an exemplary microcontroller 100 appropriate for the present invention is shown. Microcontroller 100 includes a processor 36 along with a set of peripherals, for example, PCI master 83 and PCI target 85, which may be memory mapped peripherals, and also optionally includes an integrated write back cache (not shown explicitly).

Microcontroller 100 further provides registers 70 that are programmable address region (PAR) registers enabling flexible placement of memory and peripherals into a memory address space and an input/output address space. PAR registers 70 also control attributes such as cacheability, write protection, and code execution for memory resources. PAR registers 70 and configuration base address register (CBAR) 78 operate as address decode registers. The CBAR 78 is direct-mapped to input/output.

Microcontroller 100 further includes an address decoding unit (ADU) 38 to provide flexible distributed memory and I/O address decode logic. Address decode is distributed between a general purpose bus controller 24, memory controllers such as a read-only memory (ROM) controller 10 and a synchronous dynamic random access memory (SDRAM) controller 20, and a Peripheral Component Interconnect (PCI) bus 82. Computer peripherals are generally directly mapped to I/O and integrated peripherals are generally memory-mapped. The memory space and I/O space of a general purpose bus 72 are accessible via processor 36. The memory space and I/O space of the PCI bus 82 are accessible by processor 36, PCI master controller 80, and external PCI bus masters.

Microcontroller 100 additionally includes system arbiter 26. System arbiter 26 includes an arbiter 66 for performing arbitration for internal data/address bus 76 and an arbiter 68 for performing arbitration for PCI bus 82. The processor bus arbiter 66 may arbitrate between several possible processor bus masters. For example, the processor bus arbiter 66 may handle requests for the processor 36, the general purpose bus 72 and the PCI host bridge 18 on behalf of an external PCI master connected to the PCI bus 82. The PCI bus arbiter 68 may arbitrate between five possible PCI masters.

A bus interface unit, BIU 34, shown in processor 36, is responsible for direct memory access (DMA) cache snooping, dynamic clock speed adjusting, dynamic bus sizing, and ready signal consolidation. Memory mapped configuration (MMCR) control, and general purpose address control is performed by ADU 38. BIU 34 assists processor 36 with bus, DMA and memory control.

Clock generation module 58 provides oscillators and phase locked loops (PLLs) to support the SDRAM controller 20, UARTs 40, general purpose timers (GPT) 52 and a real-time clock (RTC) 60. RTC 60 supports binary or BCD representation of time, calendar, and alarm, its own power pin and reset, 14 bytes of clock and control registers, 114 bytes of general purpose RAM, three interrupt sources, battery backup capability, and an internal RTC reset signal to perform a reset at power up.

The SDRAM controller 20 provides SDRAM support, symmetric and asymmetric SDRAM support, auto refresh support, SDRAM Error Correction Code (ECC) support, SDRAM write buffering support, SDRAM read pre-fetching support, read-around-write support, and support for a pre-determined number of bytes of SDRAM, of at least 256 megabytes. The SDRAM controller 20 may service requests from processor 36, PCI host bridge 18 on behalf of a PCI master, or the general purpose bus DMA controller and may issue commands to SDRAM devices. SDRAM cycles may also be initiated by a write buffer 28 or a read buffer 30 internal to the SDRAM controller 20. The write buffer 28 and the read buffer 30 together optionally provide buffering techniques to optimize SDRAM system performance.

A data steering block 12 stores data and routes data as needed for 8/16-bit devices from and to the general purpose bus 72 to and from an internal data/address bus 76. On DMA SDRAM reads, the data steering block 12 optionally saves data until the next address strobe.

A general purpose bus controller 24 controls the general purpose bus 72, an internal and external bus that connects 8 or 16-bit peripherals to the microcontroller 100 without external logic gates.

General purpose bus controller 24 includes 8 external chip selects, programmable bus interface timing, "ready" signal support for external devices, and support for 8/16-bit I/O and memory-mapped I/O cycles.

General purpose bus 72 supports a programmable interrupt controller (PIC) 48, a programmable interval time (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and compatibility logic 74.

Microcontroller 100 includes a DMA controller 22 shown as a general purpose bus DMAC coupled to general purpose bus 72. DMA controller 22 is shown integrated with general purpose bus controller 24. DMA controller 22 is designed to handle any DMA accesses between general purpose bus peripherals (internal or external) and SDRAM. Features of DMA controller 22 optionally include support for up to 7 DMA request channels (with a maximum of 4 external requests), support for three 16-bit channels and four 8-bit channels, buffer chaining capability in enhanced mode, fly-by transfers between general purpose bus peripherals and SDRAM, and variable clock modes. Programmable I/O unit (PIO) 50 provides PIO logic to support 32 programmable I/O signals (PIOs) to monitor signals and control devices not handled by other functions of microcontroller 100. The PIOs are shared with other functions on microcontroller 100.

Timer unit 52 provides general purpose timers for generic timing or counting applications. Features of the timers unit include three 16-bit timers, two-stage cascading of timers, and several modes of operation. Microcontroller 100 additionally includes an in-circuit emulator (ICE) core DEBUG 42 which provides an integrated debug interface for embedded hardware/software debug during a special debug mode, ICE mode. Controllability and observability may be achieved through a fast JTAG-compliant serial interface 46. A PCI host bridge 18 is integrated into the microcontroller 100 that allows processor 36 to generate PCI master transactions and allows external PCI masters to access the microcontroller SDRAM space. The PIC 48 includes three industry standard programmable interrupt controllers (PICs) integrated together with a highly programmable interrupt router. Two of the PICs 48 may be cascaded as slaves to a master PIC that arbitrates interrupt requests from various sources to the processor 36. The PICs 48 may be programmed to operate in a variety of modes. For example, PIC 48 optionally includes a router that may handle routing of a plurality of various external and internal interrupt sources to interrupt channels of a plurality of PICs. A programmable interval timer (PIT) 62 is shown coupled to external general purpose bus 72. PIT 62 provides three 16-bit general purpose programmable channels, six programmable counter modes, and binary and BCD counting support.

Microcontroller 100 further includes an integrated reset controller 44 to control the generation of soft or hard resets to the processor 36 and system resets to the various internal cores. The reset controller 44 provides a control bit to enable ICE mode after the processor 36 has been reset.

Figure 2:
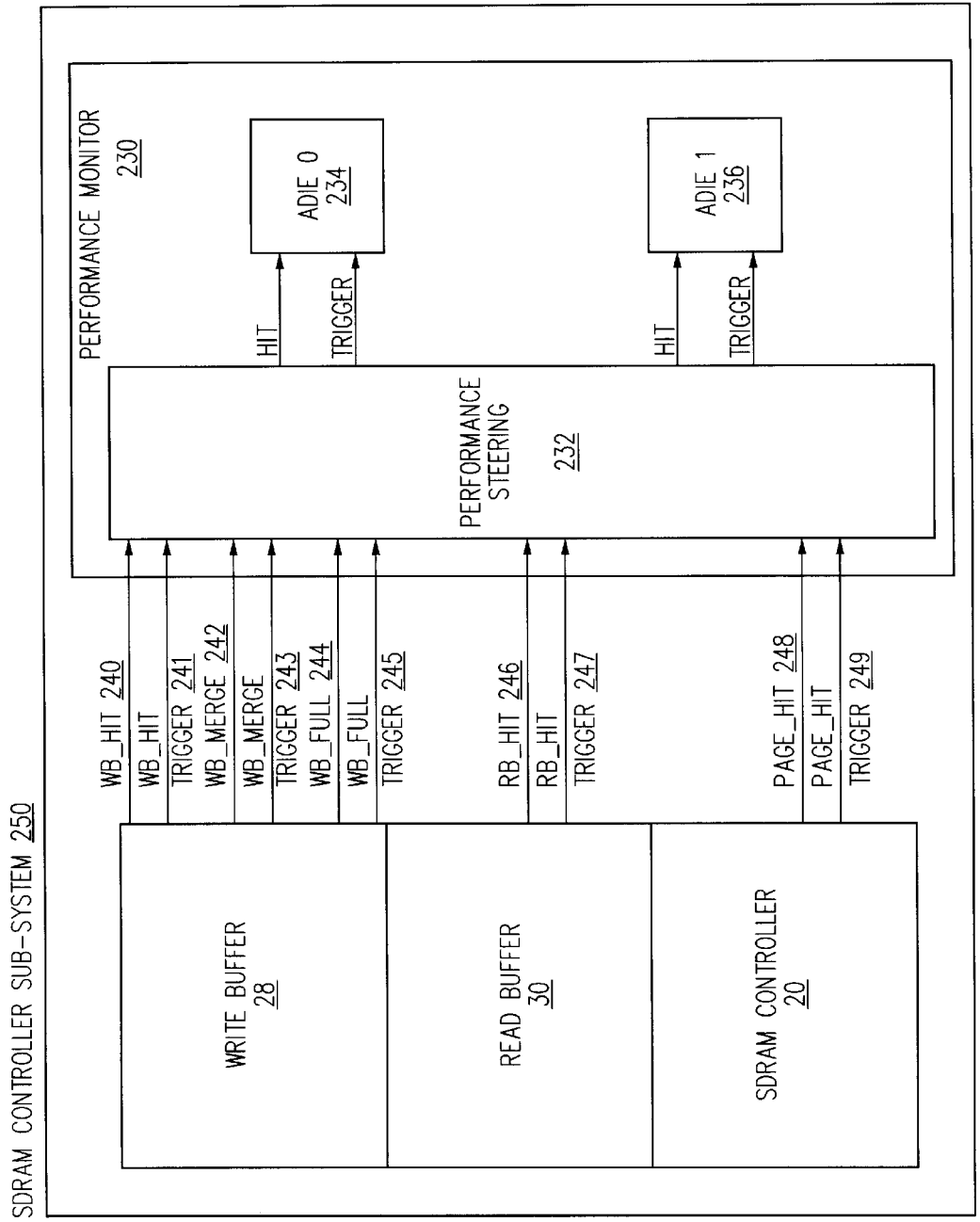
FIG. 2 shows a performance monitoring circuit coupled to a controller in accordance with one embodiment of the present invention.

Referring now to FIG. 2, an embodiment of the present invention is shown within SDRAM controller sub-system 250. SDRAM controller sub-system 250 includes an SDRAM controller 20, a read buffer 30, and a write buffer 28, each of which are coupled to performance monitor 230. More specifically, SDRAM controller 20 is coupled to write buffer 28 and read buffer 30. Write buffer 28 functions to queue writes to SDRAM via bus 90 shown in FIG. 1. Read buffer 30 functions to queue read data from SDRAM via bus 90. Performance monitor 230 performs the monitoring of parameters received from write buffer 28, read buffer 30 and SDRAM controller 20. According to an embodiment, performance monitor 230 includes a performance steering module 232 and at least one adaptive adder circuit, shown in FIG. 2 as adaptive adder circuits 234 and 236. Adaptive adder circuits 234 and 236 are shown coupled to performance steering module 232.

According to one embodiment, performance steering module 232 is a multiplexer with control signals provided outside the performance monitor 230. For example, a software configurable control signal coupled to an input/output interface allows a user to configure which of parameters 240, 242, 244, 246 and 248 are received by adaptive adder circuits 234 and 236. Alternatively, a software system selects the parameter(s) independent of user input. Although FIG. 2 shows two adaptive adder circuits coupled to performance steering module 232, one of ordinary skill in the art with the benefit of the present disclosure will appreciate that the number of adaptive adder circuits can be increased or decreased according to system requirements.

Performance steering module 232 includes logic that allows a plurality of parameters 240, 242, 244, 246 and 248 to be routed from write buffer 28, read buffer 30 and SDRAM controller 20 to performance monitor 230. Each of the parameters WB_HIT 240, WB_MERGE 242, and WB_FULL 244, RB_HIT 246 and PAGE_HIT 248 relate to parameters that are monitored in the performance monitor 230. As discussed in more detail below, write buffer 28 transmits parameters WB_HIT 240, WB_MERGE 242 and WB_FULL 244; read buffer 30 transmits parameter RB_HIT 246, and SDRAM Controller 20 transmits parameter PAGE_HIT 248 to performance monitor 230. Performance steering module 232 also includes triggers associated with each of the parameters. The triggers include WB_HIT TRIGGER 241, WB_MERGE TRIGGER 243, and WB_FULL TRIGGER 245, RB_HIT TRIGGER 247 and PAGE_HIT TRIGGER 249. The triggers are signals that are active when the parameter associated with the trigger are to be monitored, or "valid." For example, when monitoring hits to write buffer 28 to identify a merge or collapse, the trigger 241 will be active to indicate that the input stream from the write buffer 28 is to be monitored. Thus, trigger 241 will be active for all writes to the write buffer 28 so as to qualify when the WB_HIT SIGNAL 240 is valid to be sampled for monitoring.

Performance monitor 230 determines statistical data related to the parameters received by one or more adaptive adder circuits such as those shown as circuits 234 and 236. According to one embodiment, the parameters received and the statistical data related to the parameters are stored in one or more performance monitor control and status registers, which may be memory-mapped registers. Performance monitor 230 determines statistical data related to each selected parameter of 240, 242, 244, 246 and 248 received. The performance monitor 230 optionally transmits the statistical data to a control register, and either a user, software program or other appropriate vehicle further processes the statistical data as further discussed below.

Write Buffer Performance Monitoring

Referring now to write buffer 28 and the performance monitor circuit 230, write buffer 28 transmits parameters "WB_HIT" 240, "WB_MERGE" 242, and "WB_FULL" 244 to performance steering module 232 as monitored performance parameters.

Write buffer 28 is optionally a 32 rank write buffer with each rank providing four bytes of write data storage. Combined, those ranks provide up to eight cache lines of write data storage for transfers initiated by the processor 36, PCI Host Bridge 18 on behalf of a PCI master 83 write, or the general purpose bus DMA controller 22.

A write transfer initiated by either the processor 36 or PCI Host Bridge 18 may be a single 32-bit data word (DWORD) or a burst of up to four DWORDs during a single tenure on the internal processor bus 76. Although a PCI master 83 on the PCI bus 82 may initiate a burst of greater than four DWORDS. Each DWORD write transaction may be either four bytes or less. A DWORD write transfer of three bytes or less is referred to as a "partial" DWORD. In general, processor 36 bursts include burst write data during a cache copy-back or write-back and not partial DWORDs. However, the PCI Host Bridge 18 may burst transfer complete DWORDs, all partial DWORDs or a combination of both. General purpose bus 72 DMA write transfers are never larger than two bytes.

To accommodate both the burst transfers by the processor 36 and PCI Host Bridge 18 and the write transfers by general purpose bus 72, according to an embodiment, write buffer 28 supports standard FIFO buffering and a write data merge and collapse feature. To provide the merge and collapse features, the write buffer 28 incorporates a Content Addressable Memory (CAM) (not shown) to perform a look-up of DWORD addresses that currently exist within the write buffer 28 with an address presented by processor 36, PCI Host Bridge 18, or DMA Controller 22 requesting the write transfer. During a burst transfer, each DWORD address during the transfer is "looked up" within the CAM. Write merging occurs when a sequence of individual writes are merged into a single DWORD. Merging implies that the same byte location is not written to more than once. For example, four individual byte transfers to addresses 0, 1, 2 and 3 will be merged in the write buffer 28 to form a single DWORD, thus converting what would be four independent byte transfers to SDRAM into a single DWORD transfer to SDRAM.

Collapsing is similar to merging with the exception that the same byte locations may be written more than once. For example, a processor cache snoop due to a PCI Host Bridge 18 burst transfer of four DWORDs to SDRAM via bus 90 first requires a cache line write-back due to a hit in the processor 36 write-back cache. First, the cache line write-back data will be written to the write buffer 28, followed by the PCI Host Bridge 18 transfer to the same four DWORD addresses. Because write buffer 28 supports collapsing, the cache line that was written to the write buffer 28 will be over-written with the write data from the PCI Host Bridge 18 transfer, thus collapsing on the cache's write-back data. Rather than eight DWORD transfers to SDRAM via bus 90, the collapse feature of the write buffer 28 only requires four DWORD transfers to SDRAM.

In addition to reducing the total number of write transactions to SDRAM via bus 90, the merge/collapse feature within write buffer 28 assists in assembling independent partial DWORD transfers into complete DWORDs. Thus, the merge/collapse feature reduces overhead associated with error correction code (ECC) Read-Modify-Write cycles because Read-Modify-Write transfers are required for ECC support only when "partial" DWORD writes occur to SDRAM via bus 90. Complete DWORD writes do not require a Read-Modify-Write function and accordingly do not include overhead associated with ECC Read-Modify-Write cycles.

According to an embodiment, write buffer 28 transmits a signal representing the status of merges and collapses of data as "WB_HIT" 240 to one of the two adaptive adder circuits, 234 or 236, shown in FIG. 2. The receiving adaptive adder circuit determines a "hit" average, over a predetermined amount of time, of the number of write buffer 28 "hits" that occur during either a processor 36, PCI Host Bridge 18, or DMA controller 22 write transfer. A "hit" in this context refers to a merge or collapse of write data. Each DWORD write transfer to the write buffer 28, either complete or partial, is transmitted, via the WB_HIT 240 to performance monitor circuit 230, independent of each transfer being single, or a burst of two, three or four DWORDs. Performance steering circuit 232 receives the WB_HIT 240 and WB_HIT TRIGGER 241 parameters and transmits the WB_HIT 240 and WB_HIT TRIGGER 241 parameters to an adaptive adder circuit. After processing the received parameters, either adaptive adder circuit 234 or adaptive adder circuit 236 determines a ratio (HIT/MISS) as statistical data.

According to an embodiment, adaptive adder circuit 234 or 236 provides a write buffer "hit" average. A control/status register receives the hit average. The information provides feedback via either software or via a user interface to specify an optimal setting for write buffer 28. More specifically, a user or software chooses a higher setting to allow more write data to accumulate in the write buffer 28 before write backs are initiated to SDRAM via bus 90; or choose a lower setting which causes write buffer 28 to request SDRAM accesses with fewer DWORDs in write buffer 28. A higher setting provides a greater chance for data merging and collapsing to take place and lessen the occurrence of writes from write buffer 28 interrupting read accesses. A lower setting farther causes write buffer 28 to interfere with read accesses, and lessen the occurrence of overflowing the write buffer 28 during complete DWORD transfers when write data merging and collapsing is less likely to take place.

According to the embodiment, if the control register receives a low hit average from adaptive adder circuit 234 or 236, and write buffer 28 has a high setting, then most write data is in the form of a complete DWORD, thus merging and collapsing is not taking place as often. If this is the case, a lower setting prevents a full write buffer 28. Accordingly, software or user feedback to write buffer 28 can lower the setting.

In contrast, a higher hit average with a low setting indicates there is a high occurrence of write data merging or collapsing. Accordingly, software or user feedback to write buffer 28 can set a higher setting to allow the write buffer 28 to absorb the write activity, without interrupting read accesses.

Another parameter monitored according to an embodiment of the present invention is a parameter related to the number of times write buffer 28 becomes full. Referring back to FIG. 2, parameters "WB_FULL" 244 and WB_FULL TRIGGER 245 are transmitted from write buffer 28 to performance monitor 230. Performance monitor 230 then produces statistical data related to a write buffer "full" average. More specifically, when write buffer 28 is not full, write data is posted in zero wait states. However, due to the various delays mentioned above, data may be posted to the write buffer faster than data is written to SDRAM. This may result in a full write buffer such that no more data may be posted until data is written out of write buffer 28 to SDRAM via bus 90. Knowing statistical data related to "full" average over time is correlated to a write buffer's settings. For example, settings in a write buffer determine how often the write buffer becomes full. A higher setting causes data to remain in the write buffer longer, possibly allowing write data merge or collapse to occur. A higher setting also delays requesting SDRAM service for a writeback of write buffered data to SDRAM, possibly resulting in a full buffer. A lower setting requests SDRAM service when less data is stacked into the write buffer.

According to an embodiment, the performance monitor 230 is configured to provide a write buffer "full" average, over a predetermined amount of time, of the number of write attempts by either processor 36, PCI Host Bridge 18, or DMA controller 22 for which the write request experienced write buffer 28 in a full state. A write buffer full state implies that an attempt to write a DWORD into the write buffer was stalled. Each DWORD of a write transfer is monitored, independent of each write transfer being single, or a burst of two, three or four DWORDs. A ratio of write buffer full/not full is provided by the performance monitor 230 to the control register.

According to an embodiment, the setting for write buffer 28 is provided to a user to adjust write request interruptions to SDRAM. Since read around write accesses are provided when the write buffer is enabled, the setting for write buffer 28 is provided to specify how fall the write buffer may become before requesting service to write data back to SDRAM via bus 90. Write buffer 28 requests SDRAM access when the configured setting is reached. More specifically, write buffer 28 provides four settings. A higher setting may be used to delay write accesses from interfering with read accesses by stalling write activity to SDRAM. A higher setting also provides for a greater chance of data write merging and collapsing when a large amount of partial DWORD writes are expected. A low setting may be used when it is expected that most writes to SDRAM will be complete DWORDs and merge/collapse is less likely. Monitoring the WB_FULL parameter can be used to determine the occurrence of write buffer 28 merging and collapsing. A user or software program configures write buffer 28 to a setting that yields the lowest write buffer "full" average.

In addition to WB_MERGE 242 and WB_MERGE TRIGGER 243 of write buffer 28, are also provided to performance monitor 230. WB_MERGE 242 relates to the number of read merges performed by write buffer 28.

More specifically, the merge and collapse feature of write buffer 28 discussed above is operable during write transfers. The merge and collapse feature allows a single entry to exist for any given address that currently exists in write buffer 28, making data read merging possible. Accordingly, a read request, by either the processor 36, PCI Host Bridge 18, or DMA controller 22 to an address that currently exists in write buffer 28 does not require write buffer 28 to first be "flushed" to SDRAM via bus 90 to maintain data coherency prior to the read request being satisfied. In contrast, standard FIFO (First-In-First-Out) buffering techniques require a write buffer to be flushed to SDRAM should a read access occur to any data that currently exists in the write buffer. When this occurs, the read access incurs overhead associated with the write back of all buffer contents to SDRAM rather than just the data that is needed to maintain data coherency.

Write buffer 28 performs a read merge when a read cycle hits a DWORD that currently exists in write buffer 28. A "read merge" implies that at least one byte, of the four bytes, within a DWORD resulted in a read merge during each DWORD of a read request. Each DWORD of a read transfer is monitored, independent of each read transfer being single, or a burst of two, three or four DWORDs. Upon the "hit" the read data returned from SDRAM is replaced, or "merged" with existing bytes from write buffer 28 at the byte resolution. The read access continues around any associated write data and the more current write data is merged in from write buffer 28 as the read data is being returned to a requesting master.

The averaging provided by the performance monitor 230 by monitoring the WB_MERGE 242 parameter can be used to determine if the read-around-write feature of write buffer 28 provides performance advantages. More specifically, when performance monitor circuit 230 receives WB_MERGE 242 and WB_MERGE TRIGGER 243 parameters performance steering circuit 232 transfers the parameters to either adaptive adder circuit 234 or 236. Adaptive adder circuit 234 or 236 determines an average number of DWORD read transfers during either a processor 36, or DMA controller a PCI Host Bridge 18 read request that resulted in a read merge from the write buffer 28. A ratio of write buffer read merge/no read merge is provided by the performance monitor 230 to a control register where the average can be retrieved by a user or a software program.

Read Buffer Performance Monitoring

Referring now to read buffer 30 and the performance monitor circuit 230, read buffer 30 transmits parameter "RB_HIT" 246 and RB_HIT TRIGGER 247 to performance steering module 232 as one of the monitored performance parameters.

According to an embodiment of the present invention, read buffer 30 includes eight 4-byte read data buffers. Read buffer 30 is designed to hold two cache lines of data; however, those of skill in the art appreciate that the cache line "size" is defined by design requirements and can vary in size greatly. The data is returned from SDRAM via bus 90 for transfers initiated by either processor 36, PCI Host Bridge 18, on behalf of a PCI master reads, or DMA controller 22 reads. During any read request to SDRAM, an entire cache line is read into read buffer 250, independent of each read transfer being single, or a burst of two, three or four DWORDs. A read buffer "hit" herein refers to a read access that "hits" the read buffer 30 and gets data from the read buffer 30, rather than having to wait for memory. When there is a read buffer "hit," at least one byte, of the four bytes, within a DWORD resulted in a read buffer hit.

Referring to FIG. 2, SDRAM controller 20 maintains two cache lines of read data within the read buffer 30. For any read request, an entire cache line of data is stored in the read buffer. When SDRAM Controller 20 has a read prefetch feature enabled and the read request is of a burst type, the entire cache line that contains the requested data, as well as the cache line following the requested cache line, is fetched from SDRAM via bus 90. The read prefetch feature of read buffer 30 accelerates SDRAM read accesses if read requests are sequential in nature such that data is supplied to a requesting master while the next cache line from SDRAM is concurrently prefetched. Read buffer 30 includes a prefetch feature that relies on a long tenure of a single requesting master. However, an anticipated prefetched line may not be used, possibly resulting in overhead associated with the unused prefetch. For example, prefetch buffering overhead results from mastership changes, program flow changes and changes in the enable state of the processor 36 cache.

Performance steering circuit 232 receives RB_HIT 246 and RB_HIT TRIGGER 247. If RB_HIT 246 is selected for analysis by performance steering circuit 232, one of adaptive adder circuit 234 or adaptive adder circuit 236 receives RB_HIT 246 and RB_HIT TRIGGER 247. Adaptive adder circuit 234 or 236 provides a read buffer "hit" average, over a predetermined amount of time, of the number of DWORD read transfers during either a processor 36, PCI Host Bridge 18 read request or DMA controller 22 read request that results in a "hit" to read buffer 30. In an embodiment, read buffer 30 is configured to store an entire cache line of read data from SDRAM, independent of the number of DWORDs requested during the read request. Therefore, performance monitor 230 scores read buffer hits on the basis of an atomic read request, during the same bus tenure, independent of burst length. A complete cycle of the read request is completed for scoring purposes regardless of the amount of read data requested during the same burst tenure. Accordingly, each read request is monitored, rather than each DWORD transferred, during that read request tenure. A read request of two, three or four DWORDs that hit within read buffer 30 are scored by performance monitor 230 as only one hit to read buffer 30 because read buffer 30 maintains an entire cache line of data. Thus, a hit of one DWORD during a read burst request is guaranteed to hit the remaining data in that cache line during that same bus tenure. This is done rather than unfairly scoring four read buffer hits during a burst of four DWORDs requested since the entire cache line would result in a hit. For example, four independent read requests of one DWORD each results in four independent read buffer hits by performance monitor 230 because each read transfer was an individual read request. A ratio of read buffer HIT/MISS is provided by the performance monitors.

Performance monitor 230 provides a read buffer hit average as statistical data to a control/status register after performance steering circuit 232 transmits RB_HIT 246 parameter to an adaptive adder circuit for analysis. Either a software program or a user then interprets the hit average to determine whether the read prefetch feature of read buffer 30 should be enabled. For example, assuming the prefetch feature is enabled, a high read buffer hit average means that the read prefetch data has a high occurrence of being used. A low read buffer hit average enabled means that the read prefetched data is not being utilized, thus disabling the read prefetch feature may be desirable.

SDRAM Controller Performance Monitoring

Referring now to SDRAM controller 20 and the performance monitor circuit 230, SDRAM controller 20 transmits parameter "PAGE_HIT" 248 to performance steering module 232 as a monitored performance parameter.

SDRAM controller 20 internally supports a plurality of memory banks within the SDRAM devices. The page width of the memory banks are defined by the SDRAM devices symmetry. For example, SDRAM devices with 8-bit, 9-bit, 10-bit or 11-bit column address widths have either a 1 KB, 2 KB, 4 KB or 8 KB page width for a 32-bit data bus width.

The overhead associated with opening an memory bank relates to how often an open memory bank is utilized. Performance improves the more an open memory bank is utilized. A memory bank's page is left open after each access. A page miss occurs when a master access to a particular memory bank is not to a page that is currently open within that device. The penalty incurred results in a delay associated with closing the currently open page and opening the requested page of the requested memory bank. A bank miss occurs when a master accesses a memory bank and there are currently no open pages, for instance after a refresh cycle. The penalty incurred results in a delay associated with opening the requested page. Thus, the overall performance of SDRAM controller 20 is directly impacted by the overhead associated with a page or bank miss. The more often an access occurs to an open page, the faster data is returned to the requesting master during a read access, or written to SDRAM via bus 90 during a master write access. Master accesses that are sequential in nature will hit within an open SDRAM page and yield higher SDRAM access performance.

In general, many system parameters and configurations contribute to the dynamics of SDRAM page and bank misses, including program flow, processor 36 cache enable, processor 36 cache actions, the number of active GP-Bus DMA channels that are active, and the number of PCI masters and their burst size. For example, read accesses initiated by a prefetch of processor 36 are typically sequential, until the program flow changes due to a program branch, and may tend to utilize an open SDRAM page more frequently. Processor 36 write accesses tend to be directly program dependent and not predictable and may result in SDRAM page "thrashing." These dynamics change when processor 36 has its cache enabled and when processor 36 is in write-through or write-back mode. PCI read transfers via bus 82 are linear in nature and those transfers that request a large burst will utilize an open page. Although the dynamics associated with program flow and master accesses heavily dictate the page and bank miss rates, a user or a software program can control some SDRAM parameters that may lessen the impact associated with system dynamics. For example, a user or software program can alter: (1) page widths by selecting devices with either 8-bit, 9-bit, 10-bit or 11-bit column addresses; (2) the number of memory banks supported within SDRAM devices; (3) the refresh rates; and (4) the watermark setting of the write buffer, or the enable state of the write buffer.

According to an embodiment, performance monitor 230 provides statistical data related to a page-bank "miss" average, over a predetermined amount of time, of the number of read, write or write buffer transfers resulting in a page-bank miss to SDRAM. The performance monitor scores SDRAM page-bank accesses on the basis of an atomic request, during the same bus tenure, independent of burst length (i.e., complete cycle regardless of the amount of data requested during the same burst tenure.) Therefore, each request is monitored during the requested cycles tenure. The requests are monitored because, after an access, the page within each bank of the SDRAM devices remains open, independent of the number of DWORDs requested during the cycle request. A processor 36, PCI Host Bridge 18 or DMA controller 22 request of one, two, three or four DWORDs that hits within an open page are scored by the performance monitors as only one miss to the page because remaining DWORDs during a burst request are guaranteed to result in a page hit during that same bus tenure. Thus, the first access is scored independent of the amount of data transferred in that single cycle bus tenure. This is done rather than unfairly scoring one page-bank miss and three following page-bank hits during a burst of say, four DWORDs since the remaining three transfers will always result in a page hit. Four independent read or write requests of say, one DWORD each will result in four independent hit/misses by the performance monitor since each read or write transfer is an individual request. The write buffer 28 always writes single DWORDs, therefore each write buffer write is scored independently because write buffer 28 write backs are single DWORD in nature and provide a read around write function. For example, one DWORD of an entire cache line written into write buffer 28 is written into SDRAM while the remain DWORDs of the same cache line remain in the write buffer. If a higher priority read request demanded access to SDRAM over the write buffer's access, the dynamics of the page-bank relationship are changed, resulting in a different page-bank miss occurrence over the same scenario where a write burst occurs, but with the write buffer disabled. A ratio of page-bank HIT/page-bank MISS is provided by the performance monitor 230.

Performance monitor resources may be configured to provide a page-bank "miss" average. This information can be used to provide feedback on which SDRAM Controller configuration or SDRAM device architecture results in the best overall SDRAM page performance.

According to an embodiment, SDRAM Controller 20 supports SDRAM device architectures yielding a page width from 1 KB to 8 KB with a 32-bit data bus. Performance monitor 230 determines whether SDRAM devices within controller 100 have better page performance when the device has a smaller or larger page size. Thus, the page-bank "miss" average is supplied by one of the adaptive adder circuits 234 or 236 to the SDRAM Controller's control status/registers.

The number of memory banks supported may also play into the overall page performance of the device. In general, SDRAM devices support either two or four bank architectures. According to an embodiment, performance monitor 230 can be used to determine which SDRAM memory bank architecture yields better page performance.

A SDRAM refresh cycle closes all pages of all banks within the SDRAM devices. Therefore, any access to a bank after a refresh occurs will result in a bank miss, thus incurring the associated overhead penalty. Therefore, refresh rate directly impacts system SDRAM performance. A faster refresh rate will close the SDRAM pages more often than a slower rate. The refresh rate is dictated by the SDRAM device itself and is a function of the number of rows the device contains. Some devices may allow for a slower refresh rate since the column width is wide. Performance monitor 230 may be used to select the SDRAM Controller 20 refresh rate to see the effects of the refresh cycle on page performance. In general, a device may be over refreshed, and not under refreshed without the risk of loosing data integrity.

When write buffer 28 is enabled, read accesses have priority over writes, thus read requests are serviced faster than write requests. Write buffer 28 and the write buffer settings are capable of changing the SDRAM page dynamics so that a strict access ordering to SDRAM is no longer preserved. Posted writes influence the page state of devices that did not occur yet to SDRAM. Thus, a following read access may utilize a page that is currently open rather than possibly experiencing a closed page due to the write access hadn't the write buffer been enabled. The write buffer's watermark setting has a direct impact on when data is written to SDRAM. A low watermark setting causes the write buffer to request a write back earlier than a higher setting. Performance monitor 230 may be used to monitor the page performance based on the write buffer 28 enable state or settings.

According to an embodiment, a software handler configures performance monitor 230, reads the monitor's performance data and calculates the average percentage of the occurrence of the parameters being monitored. In an embodiment, adaptive adder circuits 234 and 236 provide an 8-bit value that represents the overall average. This hexadecimal value is divided by 256, which represents the maximum value, to determine the percentages.

According to the embodiment, a configuration register selects the parameter from among parameters 240, 242, 244, 246, and 248 to be monitored. The configuration register may be reset through a programmable reset. Thus, performance monitor 230 may be disabled by a system reset or programmable reset event. In some embodiments, the configuration register may be unaffected by the programmable reset. Performance monitor 230 is enabled by accessing the configuration register that selects the parameter that is to be monitored. When the parameter being monitored is altered by accessing a configuration register, a certain amount of time is necessary for the adaptive adder circuit 234 or 236 to begin to track the newly configured parameter. Disabling the performance monitor 230 causes the monitor status to freeze and retain its value prior to being disabled.

Figure 3:
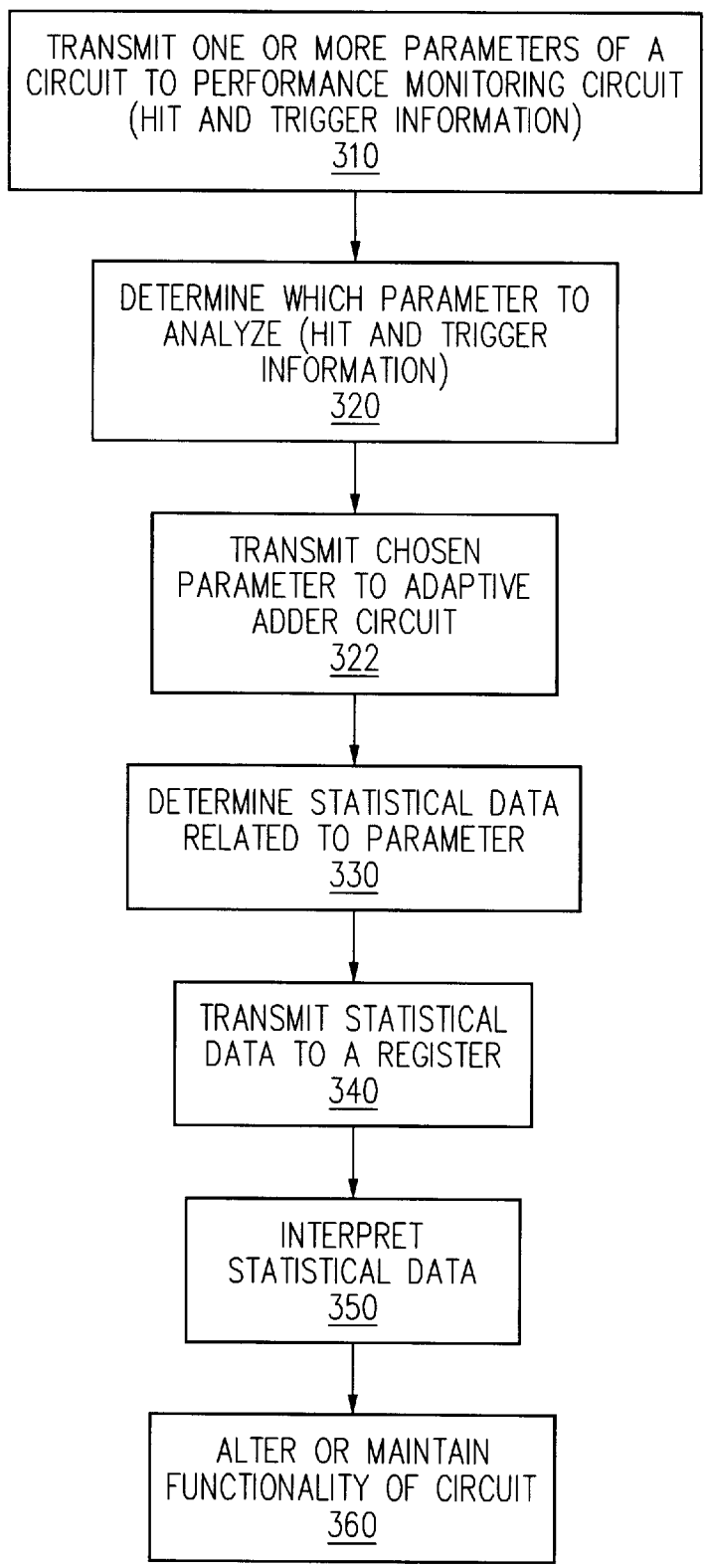
FIG. 3 shows a flowchart of an embodiment of the invention.

Referring now to FIG. 3 in combination with FIG. 2, a flow diagram illustrates a method in accordance with an embodiment of the present invention. More particularly, as shown, the method begins with step 310 in which an integrated circuit component, such as one of write buffer 28, read buffer 30, and SDRAM controller 20, transmits one or more performance parameters to performance monitoring circuit 230. In step 320, performance monitoring circuit 230 receives the parameter in performance steering circuit 232 and performance steering circuit 232 responds to a selection of which parameter or parameters to analyze, e.g., by the configuration register. In response to a selection of a parameter via the configuration register, performance steering circuit 232 supplies parameter data to be analyzed.

In step 322, performance steering circuit 232 transmits the chosen parameter to an adaptive adder circuit for analysis.

The adaptive adder circuit, such as one of either adaptive adder circuit 234 or 236, determines statistical data related to the parameter received in step 330. Once the adaptive adder circuit determines the statistical data, the adaptive adder circuit places the statistical data in a register, either by being read directly to a memory-mapped register or by optionally being transmitted to a register in step 340. A user or a software program reads and interprets the statistical data in step 350. In step 360, the statistical data is applied to alter or maintain the functionality of the integrated circuit.

The parameter received by performance monitor 230 is a stream of input data transmitted to the performance monitor 230 over a period of time. The period of time is variable and depends, inter alia, on the period of time that is statistically significant for a given parameter, and on how long the adaptive adder circuit requires to begin to track the parameter chosen.

Figure 4:
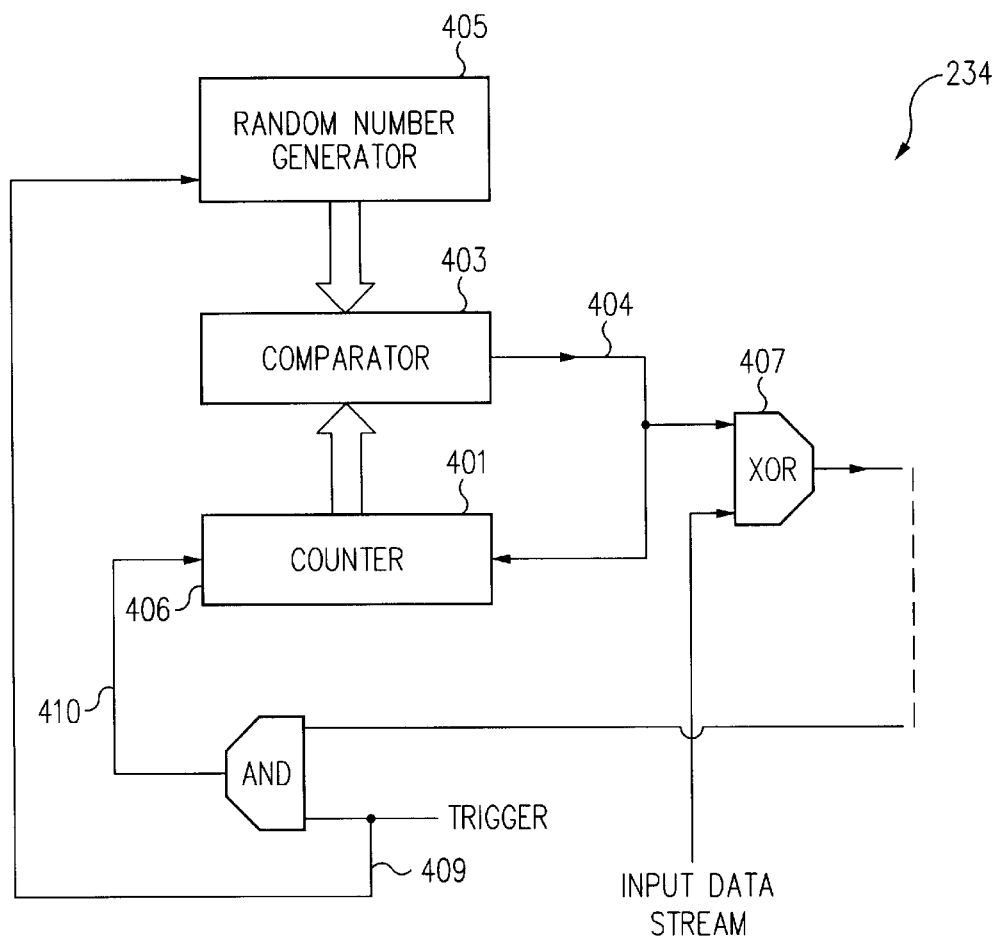
FIG. 4 shows a schematic diagram of an adaptive adder circuit in accordance with an embodiment of the invention.

Referring now to FIG. 4, each of adaptive adder circuits 234 is shown in further detail. Although only adaptive adder circuit 234 is shown, those of ordinary art appreciate that adaptive adder circuit 236 is identical in the respects described. An adaptive adder circuit is also shown in U.S. patent application Ser. No. 09/072,830, "Non-Intrusive Performance Monitoring" to Daniel Mann, filed May 5, 1998, incorporated herein by reference.

Adaptive adder circuit 234 provides the statistical data after operating on the received parameter data, holding the statistical data in counter 401. More specifically, counter 401 provides a count value, which is compared in comparator 403 with a random number, generated in random number generator circuit 405. If the counter value is greater than or equal to the random number, a one is generated. Large counter values are more likely to produce a one output from the comparator than small counter values. The compare signal 404 output from the comparator is provided back to counter 401 as an up/down count signal. When the comparator indicates that the count is larger than the random number, the compare signal 404 configures the counter 401 as a down counter; and when the count is less than the random number, the compare signal 404 configures counter to be an up counter.

The compare signal 404 is compared with the input data stream provided via performance steering circuit 232. The input data stream, one of signals 240, 242, 244, 246, and 248, shown in FIG. 2, is serially provided samples of the performance parameter being measured. The input data stream and the compare signal 404 are compared to see which one has the highest probability of being one. XOR gate 407 accomplishes the comparison by XORing the two data streams. When the data streams differ, there is a difference in probability. That probability information is fed back to increase or decrease the counter value according to the comparator output. The feedback in the illustrated embodiment is accomplished by ANDing together trigger signal 409 and the output from XOR gate 407 to provide a gated trigger signal 410 to the counter. Consequently, with each new comparison, the counter adjusts to produce a probability stream (from the comparator) which approaches the input data stream. Referring back to FIG. 2, the trigger signal 410 is one of the triggers 241, 243, 247, and 249 shown coupled to performance steering circuit 232.

The adaptive adder circuit effectively integrates the probability stream. The probability stream of the parameter being measured is converted into a digital value, which is held in the counter 401. The counter value represents the probability of the parameter that is being measured, i.e. statistical data.

In one embodiment, the adaptive adder circuit resides on an integrated circuit that includes a microprocessor and a microcontroller. In that case, a select register optionally controls parameter selection and the adaptive adder circuit counter is accessible by the processor. The select register and counter could be mapped into register, I/O or memory address space. In addition, these registers may be accessible from an input/output port providing test and debug access to internal registers of the processor, as is known in the art. A host computer (not shown) connected to the input/output port, can unobtrusively examine performance parameters.

The description of the invention set forth herein is illustrative, and is not intended to limit the scope of the invention as set forth in the following claims. Variations and modifications may be made based on the description set forth herein, without departing from the scope and spirit of the invention as set forth in the following claims.

What is claimed is:

1. A integrated circuit comprising:
a memory controller;
one or more buffers coupled to the memory controller; and
a performance monitoring circuit, the performance monitoring circuit coupled to the one or more buffers, the performance monitoring circuit to receive at least one parameter corresponding to the buffers and to provide statistical data corresponding to the parameter;
wherein the performance monitoring circuit comprises:
at least one adaptive adder circuit coupled to receive an input signal indicative the parameter of the integrated circuit and to provide the statistical data corresponding to the parameter.

2. The integrated circuit recited in claim 1 wherein the statistical data corresponding to the parameter is used to set an amount of data to accumulate in the one or more buffers.

3. The integrated circuit recited in claim 1 further comprising:
a configuration register coupled to the performance monitoring circuit, the configuration register coupled to select at least one parameter of the integrated circuit for the performance monitoring circuit to receive.

4. The integrated circuit recited in claim 1 wherein:
the statistical data corresponding to the parameter is an average used to set an amount of data to accumulate in the one or more buffers and optimize a number of transactions to a location in memory.

5. The integrated circuit recited in claim 1 wherein the adaptive adder circuit is further coupled to receive a trigger signal indicative of the validity of the input signal.

6. The integrated circuit recited in claim 1 wherein the statistical data corresponding to the parameter is used to configure a component of the integrated circuit.

7. The integrated circuit recited in claim 1 wherein the one or more buffers includes a write buffer, the write buffer including a merge and collapse function, the merge and collapse function including a read merge function, the write buffer coupled to provide a read merge parameter to the performance monitoring circuit.

8. The integrated circuit recited in claim 7 wherein the statistical data corresponds to a read merge average and the performance monitoring circuit provides the statistical data to optimize the write buffer.

9. The integrated circuit recited in claim 1 wherein the one or more buffers includes a write buffer with a merge and collapse function, the merge and collapse function operable to merge and collapse a location in the write buffer, the write buffer coupled to the performance monitoring circuit to provide a merge and collapse parameter, the performance monitoring circuit coupled to generate a hit ratio as statistical data corresponding to the merge and collapse parameter.

10. The integrated circuit recited in claim 1 wherein the one or more buffers includes a write buffer, the write buffer coupled to the performance monitoring circuit to provide an occupancy parameter, the performance monitoring circuit coupled to generate an occupancy ratio as statistical data corresponding to the occupancy parameter.

11. The integrated circuit recited in claim 10 wherein the occupancy ratio indicates a statistical likelihood of over-occupancy of the write buffer.

12. The integrated circuit recited in claim 1 wherein the one or more buffers includes a read buffer, the read buffer designed to hold at least two cache lines of data, the read buffer coupled to provide a parameter corresponding to read buffer hits to the buffer to the performance monitoring circuit.

13. The integrated circuit recited in claim 12 wherein the performance monitoring circuit receives the parameter corresponding to read buffer hits and produces a hit ratio as statistical data.

14. The integrated circuit recited in claim 13 wherein the hit ratio corresponds to a statistical likelihood of whether a read request retrieved data from the read buffer rather than a synchronous dynamic read access memory (SDRAM).

15. The integrated circuit recited in claim 13 wherein a configuration of the read buffer corresponds to enabling a prefetch feature of the read buffer.

16. The integrated circuit recited in claim 1 wherein the at least one adaptive adder circuit comprises:
   a random number generator circuit providing a random number;
   a counter circuit providing the count value;
   a comparator circuit coupled to compare the random number and the count value and to output a compare signal indicative thereof, the compare signal being provided to the counter circuit as an up/down count signal; and
   a logic circuit coupled to receive the performance parameter and the compare signal and output a control signal indicative thereof, the control signal being provided for controlling operation of the counter circuit.

17. The integrated circuit recited in claim 1 further comprising:
   a software handler coupled to receive the statistical data corresponding to the parameter.

18. The integrated circuit recited in claim 16 wherein the integrated circuit is a microprocessor.

19. The integrated circuit recited in claim 18 wherein the memory device includes a plurality of memory banks each of the plurality of memory banks having a predetermined page width, the memory controller coupled to provide a parameter corresponding to availability of the plurality of memory banks to the performance monitoring circuit.

20. The integrated circuit recited in claim 18 wherein the performance monitoring circuit receives the parameter corresponding to availability of the plurality of memory banks, and produces an availability ratio as statistical data, the availability ratio applicable to specify a setting for the memory device.

21. The integrated circuit recited in claim 20 wherein:
   the memory device is a synchronous dynamic random access memory device (SDRAM);
   the availability of the plurality of memory banks corresponds to whether an access attempt to one of the plurality of memory banks results in one of a page miss and a bank miss; and
   and the setting of the memory device corresponds to a setting of one of a configuration setting of an SDRAM controller and an architecture choice for the SDRAM device.

22. A method comprising:
   supplying one or more parameters corresponding to performance of one more components of an integrated circuit to a performance monitoring circuit located within the integrated circuit;
   in the performance monitoring circuit, determining statistical data corresponding to the parameter independent of an interrupt to the integrated circuit;
   interpreting the statistical data according to predetermined parameters to adopt functionality of the component; and
   one of altering functionality or maintaining functionality of the component of the integrated circuit according to the interpretation of the statistical data;
   wherein the performance monitoring circuit includes at least one adaptive adder circuit, the adaptive adder circuit including:
      a random number generator circuit providing a random number;
      a counter circuit providing the count value;
      a comparator circuit coupled to compare the random number and the count value and to output a compare signal indicative thereof, the compare signal being provided to the counter circuit as an up/down count signal; and
      a logic circuit coupled to receive the performance parameter and the compare signal and output a control signal indicative thereof, the control signal being provided for controlling operation of the counter circuit.

23. The method recited in claim 22 wherein the altering functionality includes altering at least one of:
   a page width of the component;
   a refresh rate of a component of the integrated circuit; and
   a setting in a buffer within the integrated circuit.

24. The method recited in claim 22 wherein the parameter includes one of:
   a measure of a hit rate in a cache memory;
   a measure of a miss rate in a cache memory;
   a measure corresponding to an enable state of the component;
   a merge and collapse parameter;
   an availability of a plurality of memory banks;
   a count of invalid cache lines found in the component;
   a parameter associated with bus utilization for a bus;
   a measure corresponding to cache access
   an occupancy parameter; and
   a read merge parameter.

25. An apparatus comprising:
   means for transmitting one or more parameters corresponding to performance of one more components of an integrated circuit to a performance monitoring circuit located within the integrated circuit;
   in the performance monitoring circuit, means for determining statistical data corresponding to the parameter independent of an interrupt to the integrated circuit;
   means for transmitting the statistical data to a register in the integrated circuit;
   means for interpreting the statistical data according to predetermined parameters to improve functionality of the component; and
   means for altering functionality of the component of the integrated circuit according to the interpretation of the statistical data;

wherein the performance monitoring circuit includes at least one adaptive adder circuit, the adaptive adder circuit including:

a random number generator circuit providing a random number;

a counter circuit providing the count value;

a comparator circuit coupled to compare the random number and the count value and to output a compare signal indicative thereof, the compare signal being provided to the counter circuit as an up/down count signal; and a logic circuit coupled to receive the performance parameter and the compare signal and output a control signal indicative thereof, the control signal being provided for controlling operation of the counter circuit.

26. The apparatus recited in claim 25 wherein the means for altering functionality alters at least one of:

a page width of the component;

a count of a plurality of memory banks within the integrated circuit;

a refresh rate of a component of the integrated circuit; and a setting in a buffer within the integrated circuit.

27. The apparatus recited in claim 25 wherein the parameter includes at least one of:

a measure of a hit rate in a cache memory;

a measure of a miss rate in a cache memory;

a measure corresponding to an enable state of the component;

a merge and collapse parameter;

an availability of a plurality of memory banks;

a count of invalid cache lines found in the component;

a parameter associated with bus utilization for a bus;

a measure corresponding to cache access an occupancy parameter; and a read merge parameter.

28. The apparatus recited in claim 25 wherein the apparatus is a microprocessor.

29. A system comprising:

at least one processor;

at least one bus coupled to the processor;

a memory controller coupled to the bus; and a performance monitoring circuit, the performance monitoring circuit coupled to receive at least one parameter corresponding to system performance and to provide statistical data corresponding to the parameter;

wherein the performance monitoring circuit comprises:

at least one adaptive adder circuit coupled to receive an input signal indicative the parameter of the system and to provide the statistical data corresponding to the parameter.

30. The system recited in claim 29 wherein the performance monitoring circuit is further coupled to one or more buffers, the performance monitoring circuit to receive at least one buffer parameter corresponding to the buffers and to provide statistical data corresponding to the buffer parameter.

31. The system recited in claim 29 wherein the statistical data corresponding to the parameter is used to set an amount of data to accumulate in the one or more buffers.

32. The system recited in claim 29 further comprising:

a configuration register coupled to the performance monitoring circuit, the configuration register coupled to select at least one parameter of the system for the performance monitoring circuit to receive.

33. The system recited in claim 29 wherein:

the statistical data corresponding to the parameter is an average used to set an amount of data to accumulate in the one or more buffers and optimize a number of transactions to a location in the memory.

34. The system recited in claim 29 wherein the statistical data corresponding to the parameter is used to configure a component of the system.

35. The system recited in claim 29 wherein the one or more buffers includes a write buffer, the write buffer including a merge and collapse function, the merge and collapse function including a read merge function, the write buffer coupled to provide a read merge parameter to the performance monitoring circuit.

36. The system recited in claim 29 wherein the one or more buffers includes a write buffer with a merge and collapse function, the merge and collapse function operable to merge and collapse a location in the write buffer, the write buffer coupled to the performance monitoring circuit to provide a merge and collapse parameter, the performance monitoring circuit coupled to generate a hit ratio as statistical data corresponding to the merge and collapse parameter.

37. The system recited in claim 29 wherein:

the one or more buffers includes a read buffer, the read buffer designed to hold at least two cache lines of data, the read buffer coupled to provide a parameter corresponding to a read hit access of a cache line to the performance monitoring circuit;

the performance monitoring circuit receives the parameter corresponding to a read hit of a cache line, and produces a hit ratio as statistical data, the hit ratio applicable to specify a setting for the read buffer; and the hit ratio corresponds to a statistical likelihood of whether another read request accesses the buffer.

38. The system of claim 37 wherein the setting for the read buffer is a prefetch feature, the prefetch feature either enabling or disabling a prefetch function.

39. The system recited in claim 29 wherein the adaptive adder circuit comprises:

a random number generator circuit providing a random number;

a counter circuit providing the count value;

a comparator circuit coupled to compare the random number and the count value and to output a compare signal indicative thereof, the compare signal being provided to the counter circuit as an up/down count signal; and a logic circuit coupled to receive the performance parameter and the compare signal and output a control signal indicative thereof, the control signal being provided for controlling operation of the counter circuit.

40. A computer program product comprising a computer useable medium having computer readable program code means therein, said computer readable program code means in said computer program product comprising:

computer readable program code means for causing a computer to affect supplying one or more parameters corresponding to performance of one more components of an integrated circuit to a performance monitoring circuit located within the integrated circuit;

computer readable program code means for causing a computer to affect determining statistical data in the performance monitoring circuit corresponding to the parameter independent of an interrupt to the integrated circuit;

computer readable program code means for causing a computer to affect interpreting the statistical data according to predetermined parameters to adopt functionality of the component; and computer readable program code means for causing a computer to affect one of altering functionality and maintaining functionality of the component of the integrated circuit according to the interpretation of the statistical data;

wherein the performance monitoring circuit includes at least one adaptive adder circuit, the adaptive adder circuit including:

a random number generator circuit providing a random number;

a counter circuit providing the count value;

a comparator circuit coupled to compare the random number and the count value and to output a compare signal indicative thereof, the compare signal being provided to the counter circuit as an up/down count signal; and a logic circuit coupled to receive the performance parameter and the compare signal and output a control signal indicative thereof, the control signal being provided for controlling operation of the counter circuit.

* * * * *

UNITED STATES PATENT AND TRADEMARK OFFICE
CERTIFICATE OF CORRECTION

PATENT NO. : 6,556,952 B1  Page 1 of 1
DATED : April 29, 2003
INVENTOR(S) : James R. Magro It is certified that error appears in the above-identified patent and that said Letters Patent is hereby corrected as shown below:

<u>Column 20,</u>
After line 13, add new claim 41:

--41. An integrated circuit comprising:

a memory controller; and a performance monitoring circuit, the performance monitoring circuit coupled to the memory controller and a memory device, the performance monitoring circuit to receive at least one parameter corresponding to the memory device and to provide statistical data corresponding to the parameter;

wherein the performance monitoring circuit includes at least one adaptive adder circuit, the adaptive adder circuit including:

a random number generator circuit providing a random number;

a counter circuit providing the count value;

a comparator circuit coupled to compare the random number and the count value and to output a compare signal indicative thereof, the compare signal being provided to the counter circuit as an up/down count signal; and a logic circuit coupled to receive the performance parameter and the compare signal and output a control signal indicative thereof, the control signal being provided for controlling operation of the counter circuit.--

<u>Column 15,</u>
Lines 47 and 53, the claim reference numeral "18" should read -- 41 --.

Signed and Sealed this

Ninth Day of December, 2003

JAMES E. ROGAN
*Director of the United States Patent and Trademark Office*